United States Patent [19]

Brickhouse et al.

[11] Patent Number: 5,076,705

[45] Date of Patent: Dec. 31, 1991

[54] STATIC MIXING SYSTEM WITH HIGH TURNDOWN RATIOS TO MINIMIZE PRESSURE DROPS

[75] Inventors: Paul E. Brickhouse; Michael G. Durrett; Gregory J. Hatton, all of Houston, Tex.

[73] Assignee: Texaco, Inc., White Plains, N.Y.

[21] Appl. No.: 561,396

[22] Filed: Aug. 1, 1990

[51] Int. Cl.$^5$ .............................................. B01F 5/06
[52] U.S. Cl. ................................ 366/337; 251/212; 137/512.1; 137/527
[58] Field of Search ............... 366/336, 337, 338, 340, 366/348, 349, 131, 136; 137/512.1, 527; 251/212; 521/917; 252/359 1; 138/38, 42

[56] References Cited

U.S. PATENT DOCUMENTS

| | | | |
|---|---|---|---|
| 2,456,566 | 12/1948 | Plank | 137/516.25 |
| 2,956,582 | 10/1960 | Pranter | 251/212 |
| 3,116,912 | 1/1964 | Finsberg | 366/136 |
| 3,191,613 | 6/1965 | Bagwell | 137/527 |

FOREIGN PATENT DOCUMENTS

| | | | |
|---|---|---|---|
| 577293 | 6/1959 | Canada | 251/212 |
| 2232980 | 7/1972 | Fed. Rep. of Germany | 366/136 |
| 0240335 | 10/1986 | German Democratic Rep. | 366/337 |
| 0094064 | 5/1984 | Japan | 366/349 |
| 0919724 | 4/1982 | U.S.S.R. | 366/338 |

Primary Examiner—Philip R. Coe
Assistant Examiner—Randall Chin
Attorney, Agent, or Firm—Jack H. Park; Kenneth R. Priem; Russell J. Egan

[57] ABSTRACT

A method and apparatus for improving mixing of fluids has at least two static mixing stages connected in series with a bypass valve connected in parallel across each but the last of the mixing units. The capacity of each downstream mixing unit should be such that its minimum flow requirements overlap the opening point for the check valve of the preceding mixing unit. Pressure drops exceeding predetermined limits cause the bypass valves to open allowing fluid flow therethrough thereby preventing further pressure drop through the mixing unit.

13 Claims, 1 Drawing Sheet

STATIC MIXING SYSTEM WITH HIGH TURNDOWN RATIOS TO MINIMIZE PRESSURE DROPS

BACKGROUND OF THE INVENTION

1. The Field of the Invention

The present invention pertains to a method and apparatus utilizing a static mixing system and check valves to perform acceptable levels of mixing of fluids over wide ranges of flow rates without experiencing excessive pressure drops.

2. The Prior Art

In many industries there is a need for mixers to mix fluids such as liquid/liquid, gas/liquid, and liquid/solids. Static mixing systems generally defined as mixing systems without driven parts, are often used as an energy efficient way of effecting the desired mixing. The general operating principle for the prior art static mixing systems is to have the pressure from the fluid stream converted to shear and turbulence which will cut the entrained bubbles or droplets more finely and mix the dispersed phase more homogeneously. The design of static mixing systems can vary greatly from orifices and constricted piping to various pipe insertions that cause the fluid to twist and turn creating internal eddies and back mixing. For effective mixing, most static mixing systems require a minimum pressure drop of 1 to 3 psi across them. Since the fluids are in turbulent flow regime, the pressure drop across the mixer is proportional to the square of the flow rate. Turndown ratios are necessarily low as the pressure drop increases rapidly with flow. For example, a mixer having a pressure drop of 1 psi at the low end would have a pressure drop of 100 psi when the flow rate is increased ten times.

In the petroleum industry there is a particular need to provide well-mixed fluids prior to gas/liquid and liquid/liquid sampling and/or metering. Unfortunately, the liquid and gas flows to be sampled and/or metered can vary greatly from well to well and even the flow from a single well can vary from time to time thereby making the know static mixing systems less than suitable for mixing sufficiently to achieve the desired accuracy.

SUMMARY OF THE INVENTION

The present invention preferably incorporates a number static mixing stages connected in series. Each stage but the last is comprised of a static mixing unit with a check valve connected in parallel as a by-pass for that particular static mixer unit. Each mixer unit has a capacity which exceeds that of the preceding mixer unit in the system. The subject invention provides an acceptable level of mixing while staying within tolerance for pressure drops over wide ranges of flow pressures. In addition, the several designs for static mixer units incorporating increased turndown can be used individually or in series.

BRIEF DESCRIPTION OF THE DRAWINGS

The present invention will be described, by way of example, with reference to the accompanying drawings, in which.

DETAILED DESCRIPTION OF THE PREFERRED EMBODIMENT

Figure 1:
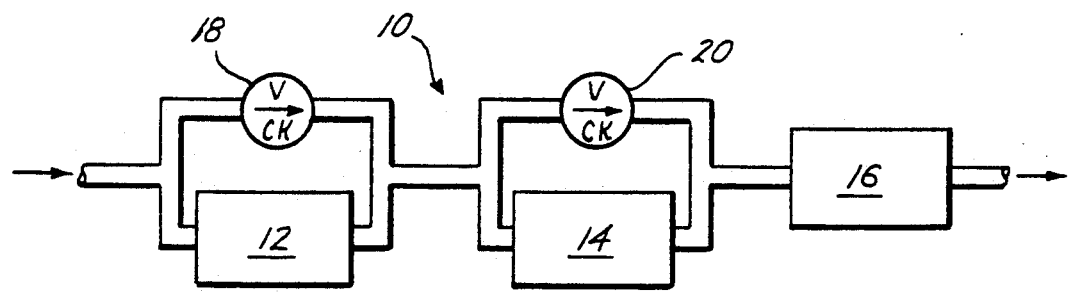
FIG. 1 is a schematic side elevation showing a representative series of mixing stages as they would be used according to the present invention.

The system according to the present invention is shown in FIG. 1. The subject system has been shown with only three stages for sake of simplicity of the drawings. It should be appreciated, by those skilled in the art, that the subject system can be applied to any number of stages and that the illustrated three-stage embodiment is convenient for discussion of the principle of the invention. Each stage consists of a static mixing unit 12, 14, and 16. The first and second stages 12,14 are each provided with a check valve 18,20 connected in parallel to the respective static mixing unit. All but the last mixing unit in any system will have a check valve in parallel and each mixing unit will have a capacity greater than that of the preceding mixing unit.

The operation of the present invention is such that, at low flow rates, the total fluid volume passes through the mixing unit in each particular stage. However, should the pressure drop through any mixing unit become excessive, the associated check valve opens and part of the fluid is bypassed around that mixing unit. The total volume of fluid flows to the next successive stage where it again goes through the static mixing unit. This is accomplished by the fact that each mixing unit has a capacity grater than the preceding stage. If there is another excessive pressure drop, this will cause the check valve of the respective stage to open and partly bypass the fluid around the mixing unit. The total volume of the fluid finally passes through the last static mixing unit.

Each static mixing unit 12,14,16 is preferably designed to handle a higher flow rate than the preceding mixing unit. Each down-stream mixing unit should be designed so that its minimum flow requirements overlap the point where the check valve in the preceding stage is actuated. The subject system will be capable of handling a wide range of flow rates and to provide adequate mixing without encountering the pressure drops which are unacceptable at high flow rates in conventional mixing schemes.

Typical inline static or motionless mixing units (not shown) consist of a series of rigid, fixed plates positioned within a tubular housing and mounted in series with the flow stream. In some arrangements the plates serve to split the input stream and then to divert the individual streams in such a way that efficient mixing is achieved. In other arrangements the plates may be simple flow restriction devices, such as orifice plates. Each set of plates in a mixing unit is typically termed an "element" and the number of elements required depends upon the flow rate, with lower flow rates requiring greater numbers of elements. The pressure loss across this type of mixing unit depends linearly upon the number of elements and quadratically on the flow rate. This tends to limit the practical flow rate turndown as more elements are needed for a sufficient mixing at lower flow rates but unacceptable pressure drops are encountered as the flow rate increases. These disadvantages of the prior art are overcome with the present invention. There are several of these know static mixing devices which are suitable for use in the subject system, for example, the LPD or ISG Ross Inline Motionless Mixer by Charles Ross & Son Co. Hauppauge, N.Y. Suitable check valves come in a wide variety of configurations from numerous sources and need not be specified for understanding of the present invention.

Figure 2:
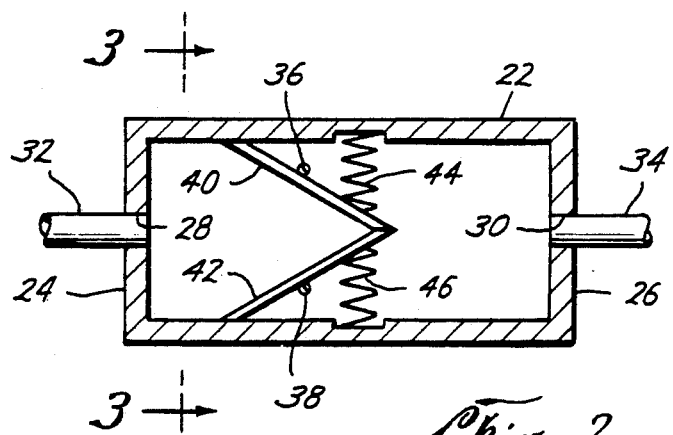
FIG. 2 is a longitudinal section through a first embodiment of a static mixing unit, according to the present invention, in the closed condition.
Figure 3:
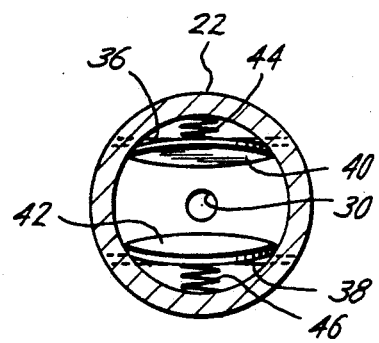
FIG. 3 is a transverse section through the static mixing unit of FIG. 2 in an open condition.

The first embodiment of a mixing unit suitable for use in the present invention is shown in FIGS. 2 and 3. The mixing unit has a generally cylindrical, elongated sleeve or housing 22. The housing is closed on both ends by plates 24,26 having respective inlet and outlet ports 28,30, each connected by known means (not shown) to respective pipes 32,34 of the system. A pair of fixed mounting rods 36,38 extend across the housing forming parallel and spaced apart cords. Plates 40,42 are mounted on rods 36,38, respectively, for rotational movement thereabout. Spring means 44,46 act between the housing walls and the respective plates 40,42 to normally bias the plates towards a closed or minimum aperture opening position.

The effective open area of the orifice formed in this mixing unit is determined by the force on the plates and the spring means mounted between the plates and the adjacent housing walls. At lower flow rates the open cross sectional area should be small enough to guarantee sufficient mixing. As the flow rate is increased, the open area becomes enlarged reducing the rate of increase of the pressure drop and thereby extending the workable flow range of the mixing unit.

It should be noted that this embodiment of the mixing unit is illustrative only and may be subject to many modifications and changes without departing from the spirit or essential characteristics thereof. For example, it is not critical to the present invention that the housing be cylindrical as many other cross-sectional configurations would serve equally well. It is also not necessary to have simply two plates as a plurality of plates could be mounted on a like plurality of rods and open and close with an iris-like effect. It is also within the purview of the present invention to replace the simple compression springs illustrated with other known biasing devices. For example, in the iris embodiment mentioned above, a circular spring could be employed around the free ends of all of the plates. Likewise, fluid actuated and/or electromechanical devices could be used to control movement of the plates. The main consideration with many of these alternatives would be the fluid pressures involved and the economics of the situation justifying the more expensive configuration.

Figure 4:
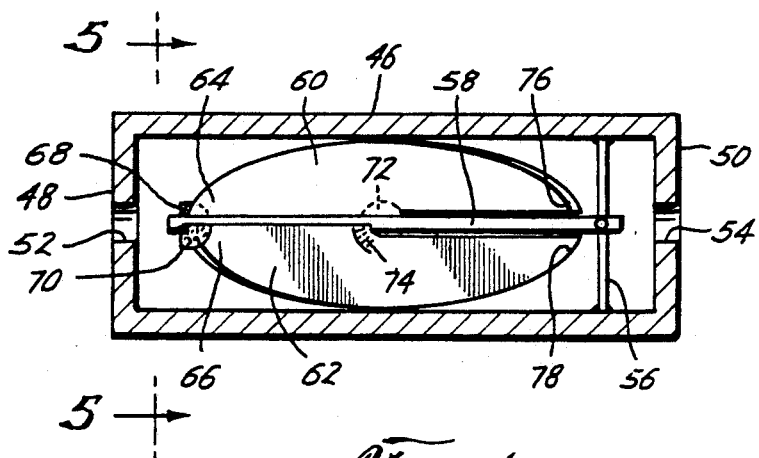
FIG. 4 is a longitudinal section through an alternate embodiment of a static mixing unit, according to the present invention, in a closed condition.
Figure 5:
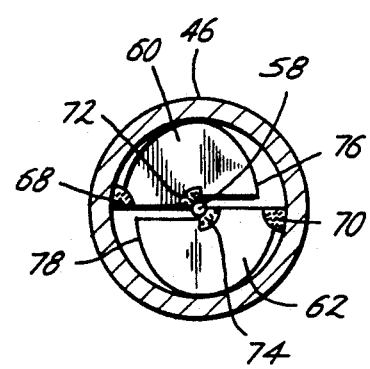
FIG. 5 is a transverse section through the alternate static mixing unit of FIG. 4, in an open condition.

A second or alternate embodiment of a suitable mixing unit for use in the subject system is shown in FIGS. 4 and 5. In this embodiment the mixing unit housing 46 is again an elongated cylindrical shell having end plates 48,50 defining respective entry and exit ports 52,54. At least one spider frame 56 is fixed extending transversely across the housing and supporting a center rod 58 which extends axially along the housing 46. A plurality of semielliptical mixing plates or elements 60,62 are mounted with the front tips 64,66 of each mixing plate tack welded to the side of the housing at 68,70 and the mid portion of each plate tack welded to the center rod 58 at 72,74 leaving the back edges 76,78 of the plates free to flex. The plates 60,62 are preferably made of a resilient material which is free to flex when force is applied. The amount of flex can be tailored to the application but should always be within the Hooks La region for the material. The number of elements should be sufficient to guarantee mixing at the lower flow rate. As the flow rate and the associated pressure drop increases, the lower or downstream portion of the mixing element plates flex outwardly allowing some of the fluid to sweep over, rather than around, the trailing half of the element. This will decrease the total pressure drop across the mixing unit. While some mixing efficiency will be lost as the plates flex outwardly, the amount of mixing required by the interaction of the stream with the mixing element plates will decrease and the flow rate and Reynolds number increases.

While both of the mixing unit embodiments described have movement, they still would be classified as static or motionless mixing units in that the movement is in response to fluid flow rather than by an external source to control fluid flow.

It should be noted that the two described embodiments of mixing units are sufficiently effective that they could, under the proper set of operating conditions, function as a single stage system without an accompanying check or bypass valve.

The present invention may be subject to many modifications and changes without departing from the spirit or essential characteristics thereof. The present embodiments are therefore intended in all respects as being illustrative and not restrictive as to the scope of the invention.

What is claimed is:

1. A system for mixing fluent materials comprising:
   at least two serially connected mixing stages, each downstream mixing stage having a capacity slightly greater than the preceding mixing stage; and
   each stage having mixing means, at least the penultimate and any preceding stage having pressure responsive bypass valve means connected in parallel to the respective mixing means
   whereby, in response to a predetermined pressure drop, said bypass valve opens to allow fluid flow around the respective mixing means thereby preventing further pressure drop the greater capacity of each successive stage assuring mixing of the material from the preceding stage.

2. A system according to claim 1 wherein said mixing means comprises:
   a housing defining a closed chamber having an inlet, an outlet and a passage connecting said inlet to said outlet;
   means mounted in said passage adapted to change the open area of said passage whereby the pressure drop through said mixing means is controlled.

3. A system according to claim 1 wherein said mixing means further comprises:
   at least one element extending transversely across said passage and mounted for movement between a first position substantially closing said passage to a second position leaving said passage open with minimum obstruction.

4. A system according to claim 3 wherein said elements are profiled with a first end forming a straight edge for meeting near the center of said passage and a second end curved to meet with the walls of said passage;
   fixed rod means forming cords across said passage, said elements being mounted on said rod means for rotational movement between passage open and passage closed positions.

5. A system according to claim 4 further comprising: means biasing said elements towards said passage closed position.

6. A system according to claim 5 wherein said biasing means comprise
spring means mounted between said elements and walls of said passage.

7. A system according to claim 5 wherein said spring means engage only said elements.

8. A static mixing system capable of performing mixing of fluids over wide ranges of flow rates without experiencing excessive pressure drops, said mixing system comprising:
at least two serially connected mixing stages, each stage having a capacity slightly greater than the preceding stage and comprising:
a housing defining a closed chamber having an inlet, an outlet and a passage connecting said inlet to said outlet;
means mounted in said passage adapted to change the open area of said passage in response to flow rate to control the pressure drop through said mixer; and
at least the penultimate and each preceding stage having pressure responsive bypass valve means connected in parallel to the respective stage.

9. The mixing system according to claim 8 comprising:
at least one element extending transversely across said passage and mounted for movement between a first position substantially closing said passage to a second position leaving said passage open with minimum obstruction.

10. The mixing system according to claim 9 wherein said elements are profiled with a first end forming a straight edge for meeting near the center of said passage and a second end curved to meet with the walls of said passage; and
fixed rod means forming cords across said passage, said elements being mounted on said rod means for rotational movement between passage open and passage closed positions.

11. The mixing system according to claim 10 further comprising:
means biasing said elements towards said passage closed position.

12. The mixing system according to claim 11 wherein said biasing means comprising:
spring means mounted between said elements and walls of said passage.

13. The mixing system according to claim 11 wherein said spring means engage only said elements.

* * * * *